United States Patent [19]

Takagi et al.

[11] Patent Number: 4,885,704

[45] Date of Patent: Dec. 5, 1989

[54] ELECTRONIC DOCUMENT FILING APPARATUS WITH ICON SELECTION

[75] Inventors: Shiro Takagi, Yokohama; Minoru Sato, Tokyo; Koji Izawa, Yokohama, all of Japan

[73] Assignee: Kabushiki Kaisha Toshiba, Kawasaki, Japan

[21] Appl. No.: 99,902

[22] Filed: Sep. 22, 1987

[30] Foreign Application Priority Data

Jan. 12, 1987 [JP] Japan .................. 62-4741
Jan. 31, 1987 [JP] Japan .................. 62-21030

[51] Int. Cl.$^4$ .............................................. G09G 1/06
[52] U.S. Cl. .................................. 364/521; 364/518; 364/200; 382/41; 340/710
[58] Field of Search ........ 364/521, 518, 200 MS File; 382/41; 358/21 R, 280; 340/709, 710, 711

[56] References Cited

U.S. PATENT DOCUMENTS

| | | | |
|---|---|---|---|
| 4,399,502 | 8/1983 | MacDonald et al. | 364/189 |
| 4,604,690 | 8/1986 | Crabtree et al. | 364/200 |
| 4,665,555 | 5/1987 | Alker et al. | 382/41 |
| 4,755,808 | 7/1988 | Bullock et al. | 340/709 |
| 4,772,882 | 9/1988 | Mical | 340/709 |

OTHER PUBLICATIONS

Ralston, Anthony ed., *Encyclopedia of Computer Science and Engineering*, 2nd edition, 1983, pp. 779–789.

Primary Examiner—A. D. Pellinen
Assistant Examiner—David Osborn
Attorney, Agent, or Firm—Finnegan, Henderson, Farabow, Garrett and Dunner

[57] ABSTRACT

A data processing apparatus includes a scanner for scanning a document, a display device for displaying the picture information, and a file device for filing the picture information. The display device can display the picture information and selection marks, i.e., icons or commands, for selecting the scanner, display device and file device. The marks are designated by a mouse to select the scanner, the display device and file device. Upon the completion of designation of the marks, the scanner, display device and file device are operated in the order in which the selection marks have been designated by the mouse.

24 Claims, 23 Drawing Sheets

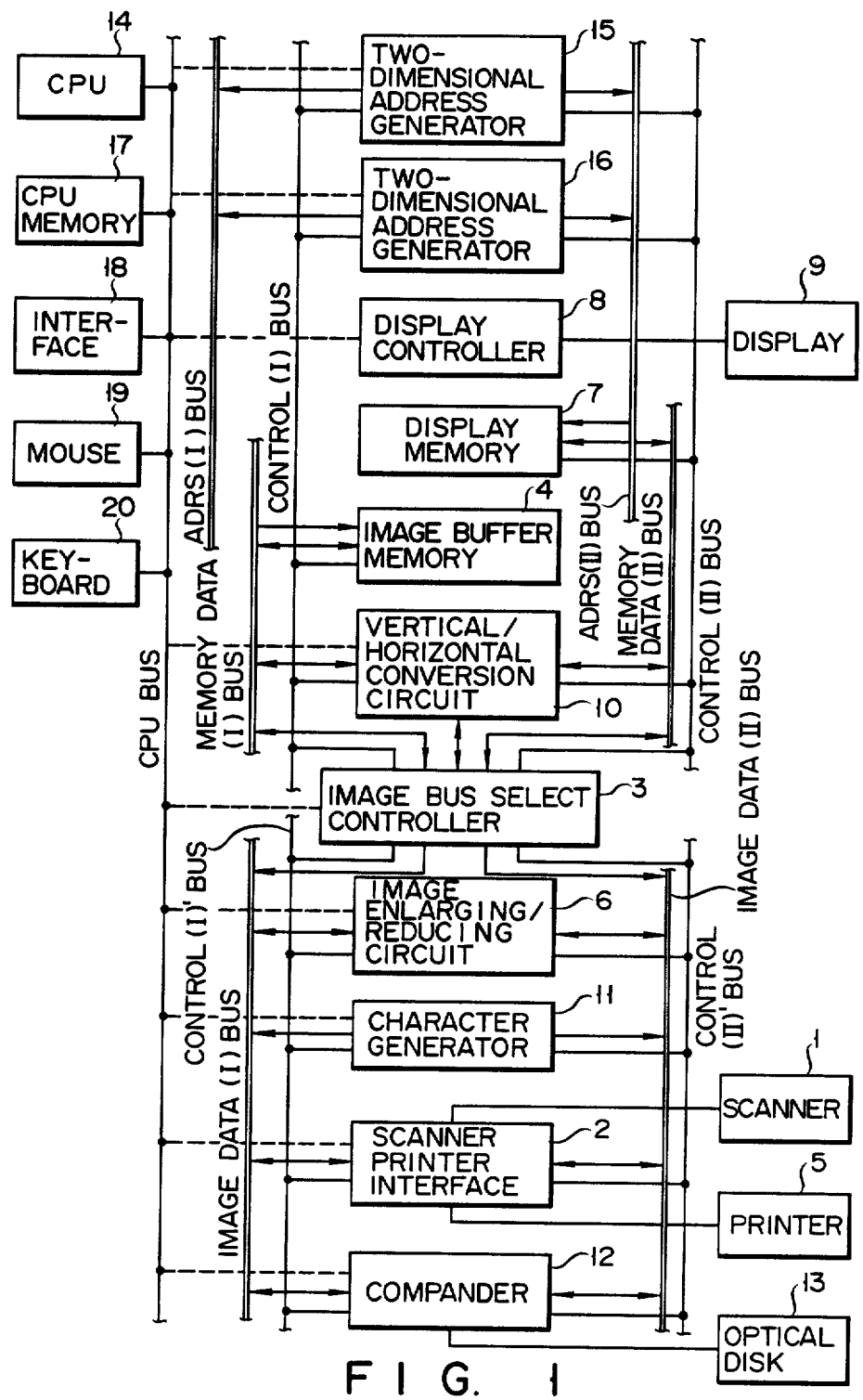
F I G. 1

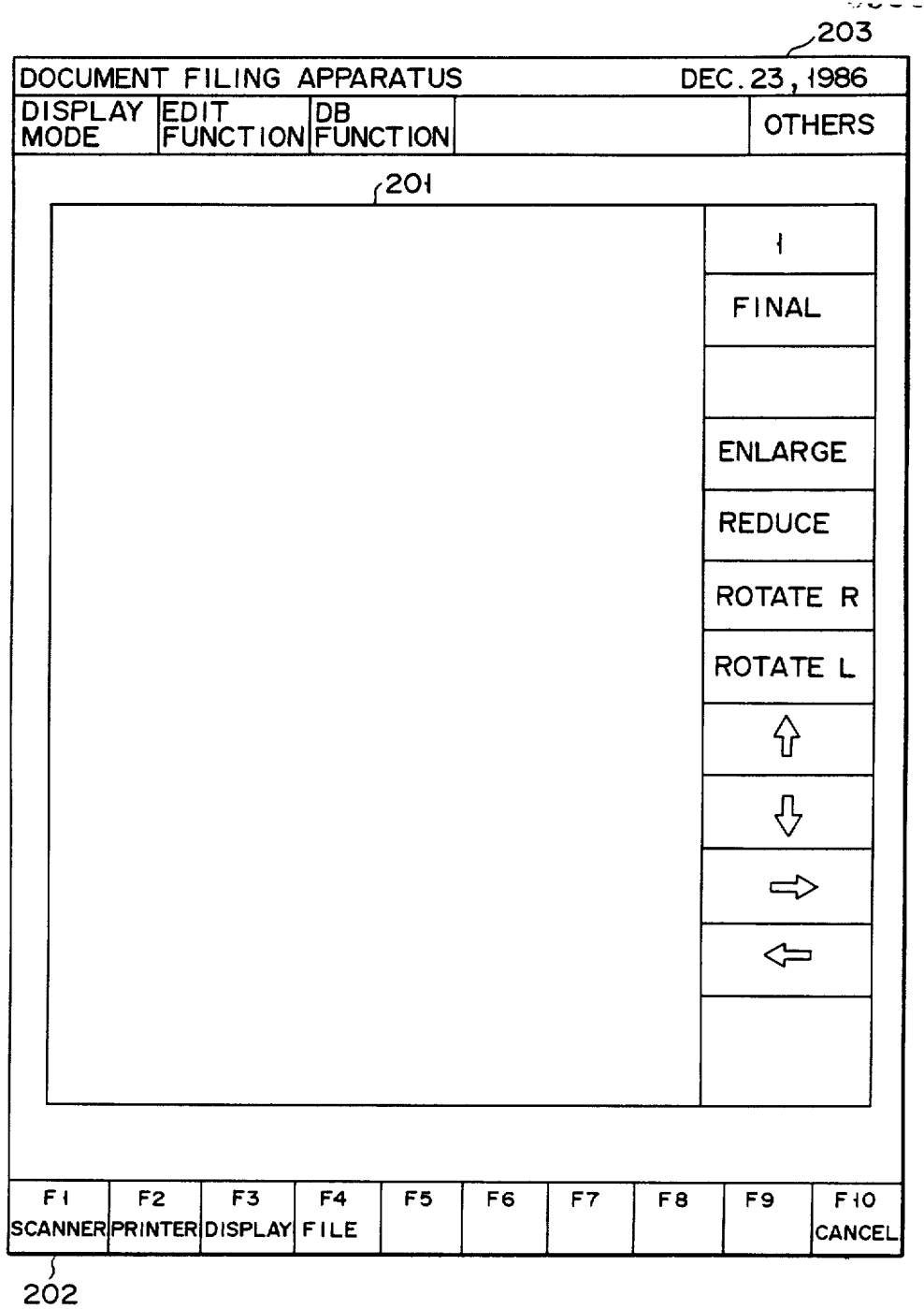
F I G. 2

| DOCUMENT FILING APPARATUS | | | | DEC. 23, 1986 | |
|---|---|---|---|---|---|
| DISPLAY MODE | EDIT FUNCTION | DB FUNCTION | | | OTHERS |

| 1 | | 2 | |
|---|---|---|---|
| | FINAL | | |
| | ENLARGE | | ENLARGE |
| | REDUCE | | REDUCE |
| | ROTATE R | | ROTATE R |
| | ROTATE L | | ROTATE L |
| | ⇧ ⇩ ⇦ ⇨ | | ⇧ ⇩ ⇦ ⇨ |

| 3 | | 4 | |
|---|---|---|---|
| | ENLARGE | | ENLARGE |
| | REDUCE | | REDUCE |
| | ROTATE R | | ROTATE R |
| | ROTATE L | | ROTATE L |
| | ⇧ ⇩ ⇦ ⇨ | | ⇧ ⇩ ⇦ ⇨ |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 3A

| DOCUMENT FILING APPARATUS | | | | | DEC. 23, 1986 |
|---|---|---|---|---|---|
| DISPLAY MODE | EDIT FUNCTION | DB FUNCTION | | | OTHERS |

| | 1 | | 2 |
|---|---|---|---|
| | FINAL | | |
| | ENLARGE | | ENLARGE |
| | REDUCE | | REDUCE |
| | ROTATE R | | ROTATE R |
| | ROTATE L | | ROTATE L |
| | ⇧ | | ⇧ |
| | ⇩ | | ⇩ |
| | ⇦ | | ⇦ |
| | ⇩ | | ⇨ |

| | 3 | | 4 |
|---|---|---|---|
| | ENLARGE | | ENLARGE |
| | REDUCE | | REDUCE |
| | ROTATE R | | ROTATE R |
| | ROTATE L | | ROTATE L |
| | ⇧ | | ⇧ |
| | ⇩ | | ⇩ |
| | ⇦ | | ⇦ |
| | ⇨ | | ⇨ |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

FIG. 3B

| DOCUMENT FILING APPARATUS | | | | DEC. 23, 1986 |
|---|---|---|---|---|
| DISPLAY MODE | EDIT FUNCTION | DB FUNCTION | | OTHERS |

|  |  |
|---|---|
|  | ↑ |
|  | FINAL |
|  |  |
|  | ENLARGE |
|  | REDUCE |
|  | ROTATE R |

SCANNER PROPERTY

| SIZE | : ( [A3], A4, A5, B4, B5 ) |
|---|---|
| DENSITY | : ( DARK, SLIGHTLY DARK, [NORMAL], SLIGHTLY LIGHT, LIGHT ) |
| RESOLUTION | : ( [NORMAL], FINE ) |
| FEED MODE | : ( [BOOK], ADF ) |
| READ DESIGNATION | : ( [CHARACTER], PHOTOGRAPH ) |
| PHOTOGRAPH MODE | : ( PHOTOGRAPH FINE, [STANDARD], CHARACTER CLEAR ) |
| ADD-ON DESIGNATION | : ( [YES], NO ) |
| DOCUMENT DIRECTION | : ( [VERTICAL], HORIZONTAL ) |

| F9 CONFIRM | F10 CANCEL |
|---|---|

| F1 SCANNER | F2 PRINTER | F3 DISPLAY | F4 FILE | F5 | F6 | F7 | F8 | F9 | F10 CANCEL |
|---|---|---|---|---|---|---|---|---|---|

F I G. 4

| DOCUMENT FILING APPARATUS | | | | DEC. 23, 1986 |
|---|---|---|---|---|
| DISPLAY MODE | EDIT FUNCTION | DB FUNCTION | | OTHERS |

```
                                              1
                                           FINAL

ENLARGE

PRINTER PROPERTY

NUMBER          :( □ )
   OF COPY

ADD-ON          :( NO , YES )
   DESIGNATION

CASSETTE        :( A3 , A4 , A5 , B4 , B5 )
   SIZE              100%  71% 82% 86%
   REDUCTION   A3:( A3 , A4 ,     B4 )
   PRINT
               A4:( A4 , A5 ,     B5 )
               B4:( B4 , B5 , A4     )
               B5:( B5 ,       A5    )

F9      F10
                                    CONFIRM  CANCEL
```

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 5

| DOCUMENT FILING APPARATUS | | | | DEC. 23, 1986 |
|---|---|---|---|---|
| DISPLAY MODE | EDIT FUNCTION | DB FUNCTION | | OTHERS |

1

FINAL

FILE PROPERTY

BINDER NAME : [          ]
FILE CONDITIONS : FILE [     ]/[    ]
PAGE [     ]/[    ]
REVISED [   ]/[  ]

1 READ OUT MODE : ( SUCCESSIVE , BATCH (PAGE)
   BATCH (DOCUMENT) )

READ ORDER  ( ASCEND , DESCEND )

2 PAGING MODE : NO PAGE PROCESSING
   PAGE ADDITION
   TOTAL NUMBER OF ADDITIONAL
   PAGES (_____)
   PAGE INSERTION
   TOTAL NUMBER OF INSERTED
   PAGES (_____)
   REVISED EDITION (_____)

3 INDEX NAME  (_____)

| F9 CONFIRM | F10 CANCEL |
|---|---|

| F1 SCANNER | F2 PRINTER | F3 DISPLAY | F4 FILE | F5 | F6 | F7 | F8 | F9 | F10 CANCEL |
|---|---|---|---|---|---|---|---|---|---|

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ IN BY THE SCANNER IS DISPLAYED IN THE DOCUMENT WINDOW (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 8

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F1)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F2)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F2)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ IN BY THE SCANNER IS PRINTED OUT (e) (F7)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

↓ (F10)

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ BY THE SCANNER IS RECORDED INTO THE OPTICAL DISK (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 10

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

ONE DOCUMENT RETRIEVED FROM THE OPTICAL DISK IS DISPLAYED IN THE DOCUMENT WINDOW (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | PREV. PAGE | | CANCEL |

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 11

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F4)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F2)     (F10)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F2)     (F10)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT RETRIEVED FROM THE OPTICAL DISK IS PRINTED OUT (F7) OR (F8)

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | PREV. PAGE | | CANCEL |

↓ (F10)

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F3)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F2)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F2)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT BEING DISPLAYED IN THE WINDOW IS PRINTED OUT (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 13

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F3)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F4)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F4)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT BEING DISPLAYED IN THE WINDOW IS RECORDED INTO THE OPTICAL DISK (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

↓ F1

(b)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

→ F10

↓ F3

(c)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

→ F10

↓ F4

(d)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

→ F10

↓ F4

(e)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | |

THE DOCUMENT FROM THE SCANNER IS DISPLAYED IN THE DOCUMENT WINDOW (f)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | RECORD | REEN-TER | | CANCEL |

→ F8
→ F10

THE DOCUMENT IN THE DOCUMENT WINDOW IS RECORDED INTO THE OPTICAL DISK (g) ↓ F7

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | NEXT PAGE | | | CANCEL |

← F7

↓ F10

(h)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

F I G. 16

(a) DESIGNATION TABLE

| NUMBER OF DESIGNATED ICONS | 1ST | 2ND | 3RD |
|---|---|---|---|
|  |  |  |  |

(b) TRANSFER TABLE

| NO | NUMBER OF DESIGNATED ICONS | 1ST | 2ND | 3RD |
|---|---|---|---|---|
| 1 | 2 | SCANNER F1 | DISPLAY F3 |  |
| 2 | 2 | SCANNER F1 | PRINTER F2 |  |
| 3 | 2 | SCANNER F1 | FILE F4 |  |
| 4 | 2 | FILE F4 | DISPLAY F3 |  |
| 5 | 2 | FILE F4 | PRINTER F2 |  |
| 6 | 2 | DISPLAY F3 | PRINTER F2 |  |
| 7 | 2 | DISPLAY F3 | FILE F4 |  |
| 8 | 3 | SCANNER F1 | DISPLAY F3 | PRINTER F2 |
| 9 | 3 | SCANNER F1 | DISPLAY F3 | FILE F4 |
| 10 | 3 | FILE F4 | DISPLAY F3 | PRINTER F2 |

F I G. 20

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | EXCU. | CANCEL |

(b) ↓ F1                                                                      F10

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | EXCU. | CANCEL |

(c) ↓ F4                                                                      F10

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | EXCU. | CANCEL |

(d) ↓ F9

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ BY THE SCANNER IS RECORDED INTO THE OPTICAL DISK (e) F7 ↓

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

(f) ↓ F10

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 22

ELECTRONIC DOCUMENT FILING APPARATUS WITH ICON SELECTION

BACKGROUND OF THE INVENTION

This invention relates to a data processing apparatus for executing data processing according to the menu displayed on a display screen and, more particularly, to a document filing apparatus performing operations similar thereto.

In recent times, several electronic document filing apparatuses have been developed and put to practical use. A document filing apparatus converts the information, including character and pictorial information, printed on documents, into electronic document image data, and files the data in a recording medium of large memory capacity, such as an optical disk or magnetic tape.

While conventional paper filing requires the availability of a large amount of document storage space, the electronic filing apparatus requires very little space for storing optical disks or magnetic tapes. The electronic filing apparatus can edit the document image data easily, by categorizing or classifying the data into groups, and assigning a key word to each group. In addition, it can record and retrieve a number of items of data quickly and easily.

The prior art document filing apparatus can perform a variety of operations such as data retrieval, data registration or recording, data deletion. To operate the apparatus, an operator designates or selects one of the above operations, as desired, whereupon the apparatus performs the desired operation. For example, when the operator designates "data retrieval", the apparatus then operates in the data retrieval mode and, having retrieved the desired document data from the recording medium, displays and/or print it.

When the data record mode is designated, the filing apparatus scans a document or documents, reads out the document data, and records it into a recording medium. Each operation mode of the filing apparatus is composed of many hierarchy sub-modes, which implies that in any of the operation modes, a given task can be accomplished only after the sub-modes have been performed. In addition, in the prior art filing apparatus, a given task can be accomplished only by use of a specific designated operation mode. Because of this, when the apparatus completes every operation, it must set in the initial mode. Consequently, the apparatus cannot continuously operate in different modes, and its operating speed as a whole is rather low.

SUMMARY OF THE INVENTION

It is an object of this invention to provide a document filing apparatus capable of executing a plurality of processing operations, such as data retrieval and data recording, with a few key operations.

A data processing device according to this invention comprises a memory unit for storing data to be recorded, a display unit for displaying the data stored in the memory unit, and a designation unit for designating selection marks also called "icons" or "commands") for selecting at least the memory unit and the display unit. When the memory unit and the display unit are operated, the display unit displays the selection marks. A first detector detects that the selection marks have been designated, in selective sequence, by the designating unit, and a second detector detects the completion of the designation of the selection marks. A drive unit drives the memory unit and the display unit in the order in which the marks have been designated, in response to the detection signal of the second detector.

BRIEF DESCRIPTION OF THE DRAWINGS

FIG. 1 shows a block diagram of a document filing apparatus according to one embodiment of this invention;

FIG. 2 shows a display including a single document window on the display screen;

FIGS. 3A and 3B show displays each containing four display windows;

FIG. 4 shows a display containing scanner properties;

FIG. 5 shows a display containing printer properties;

FIG. 7 shows a display containing file properties;

FIGS. 8 to 18 diagrammatically show transient phases of various document data transfer modes;

FIG. 20 shows a designation table (a) and a transfer table (b);

FIG. 22 shows a transient phase of document data transfer operations, using a function area with a function for starting document data transfer processings.

DETAILED DESCRIPTION OF THE PREFERRED EMBODIMENTS

Figure 6:
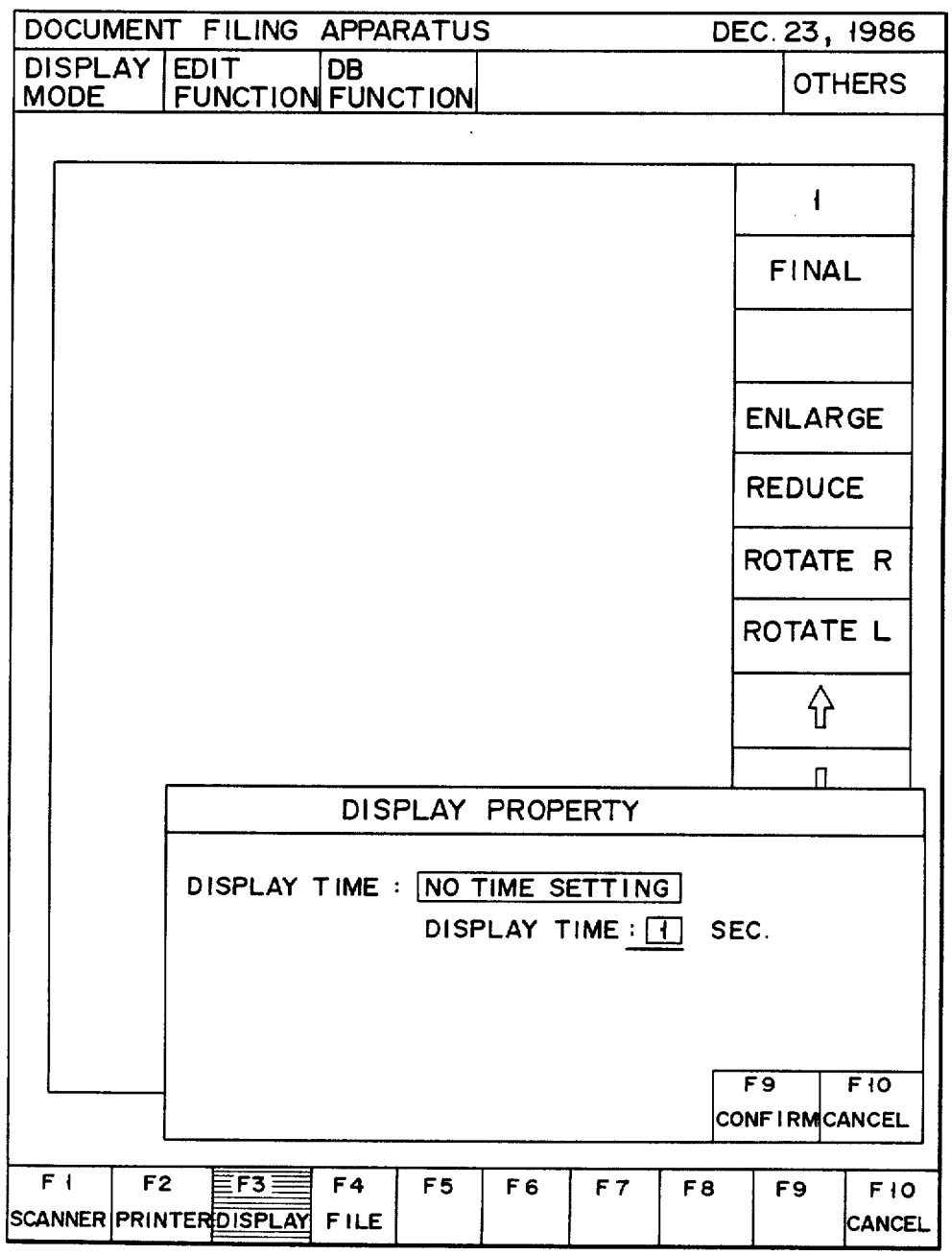
FIG. 6 shows a display containing display properties.

In a document filing apparatus shown in FIG. 1, scanner 1 and printer 5 are connected to scanner/printer interface 2. This interface 2 is connected to image data buses (I) and (II), and control buses (I)' and (II)'. These buses (I) and (II), and (I)' and (II)' are coupled with image-emlarging/reducing circuit 6, character generator 11, and compander 12. Compander 12, coupled with optical disk 13, appropriately compresses and expands the document image data recorded and reproduced to and from optical disk 13.

Image buses (I) and (II), and control buses (I)' and (II)' are connected through image bus select controller 3 to memory data buses (I) and (II). Memory data buses (I) and (II), and control buses (I)' and control buses (I) and (II) are coupled with image buffer memory 4, display memory 7, display controller 8, vertical/ horizontal conversion circuit 10 and two-dimensional address generators 15 and 16. These generators 15 and 16 are connected through address (ADRS) bus (I) to image buffer memory 4, and through address (ADRS) bus (II) to display memory 7. Display memory 7 is coupled with display controller 8 for controlling display 9.

Scanner printer interface 2, image bus 6, display controller 8, vertical/horizontal conversion circuit 10, character generator 11, compander 12, and two-dimensional address generators 15 and 16 are coupled via the CPU bus to CPU 14. The CPU bus is connected to CPU memory 17, interface 18, mouse 19 and keyboard 20.

In the apparatus shown in FIG. 1, the document image data read out by scanner 1 is loaded into the apparatus through interface 2, and stored via bus select controller 3 into image memory 4.

The document image data stored in image memory 4 is subjected to enlarging or reducing by the circuit 6, and stored into display memory 7, and is displayed by display 9 under control of display controller 8. When it is not necessary to enlarge or reduce the document image data, image-enlarging/reducing circuit 6 does not perform its operation, as a matter of course. The document image data is transferred from display memory 7 to image memory 4 in a similar way.

FIG. 2 shows an initial display on the screen of display 9 in the document filing apparatus according to the present invention. As shown, document window 201 for displaying document images including characters is substantially centered in the display screen. Icons (also called "selection marks" or "commands") are arrayed in the right portion of the document window 201, and give an operator various necessary indications, such as image-enlarging and reducing, and rotation and scroll of the displayed image. These indications by the icons are designated by a mouse or related keys on the keyboard. For example, if the "Enlarge" icon is designated, the document displayed within the document window is enlarged.

The display further contains a function area 202 provided in connection with function keys F1 to F10. The function area contains icons F1 to F10 indicating various devices for inputting and outputting documents such as a scanner, printer, display, and file. The functions of these icons F1 to F10 are:

Scanner (F1): To enter the document data from scanner 1, and transfer it to another device.

Printer (F2): To print the document data transferred from another device, by printer 5.

Display (F3): To display the document data transferred from another device by display 9, and to store it into internal image memory 4. Further, this indicates that the document data is read out from internal image memory 4 and transferred to another device.

File (F4): To record the document data transferred from another device on the optical disk, and to read out the document data from the optical disk, and to transfer it to another device.

Many types of processings can be done by appropriately combining the above four devices represented by F1 to F4, and transferring the document data between devices. For example, if the document data is transferred from the scanner (F1) to the printer (F2), a hard copy of the document can be obtained.

The document filing apparatus according to the present invention can execute ten types of document data transfers, or ten types of document data transfer modes as given below, by appropriately combining the scanner (F1), the printer (F2), the display (F3) and the file (F4).

(1) Scanner (F1)/Display (F3); Mode 1
To enter the document data from scanner 1 and to display it on document window 201.

(2) Scanner (F1)/printer (F2); Mode 2 To enter the document data from scanner 1 and to print it by printer 5.

(3) Scanner (F1)/file (F4); Mode 3 To enter the document data from scanner 1 and to record it on optical disk 13.

(4) File (F4)/display (F3); Mode M4 To retrieve the document data from optical disk 13 and to display it on document window 201.

(5) File (F4)/printer (F2); Mode M5 To retrieve the document data from optical disk 13 and print it by printer 5.

(6) Display (F3)/printer (F2); Mode M6 Print out the document data within document window 201 by printer 5.

(7) Display (F3)/file (F4); Mode M7 To record the document data within document window 201 on optical disk 13.

(8) Scanner (F1)/display (F3)/printer (F2); Mode M8
To enter the document data from scanner 1, and display it on document window 201, and check and print it by printer 5.

(9) Scanner (F1)/display (F3)/file (F4); Mode M9 To enter the document data from scanner 1, display it on document window 201, and check and record it on optical disk 13.

(10) File (F4)/display (F3)/printer (F2); Mode M10 To retrieve the document data from optical disk 13, display it on document window 201, and check and print it by printer 5.

As seem from the above descriptions, most of the retrieving and recording processings of those filing processings can be made by transferring the document data among those devices such as the scanner, printer, display and file.

Actually, optical disk 13 is used for the file. Before the processings (1) to (10) above, it is necessary to open and close the optical disk. These processings are performed in the DB function in menu bar area 203 shown in FIG. 2. This area contains a display mode and an edition function. These are for executing the following processings.

Display mode: Changes the number of document windows 201 displayed by display 9 between 1 and 4, as shown in FIGS. 2 and 3.

Edition function: To apply to the document image displayed on document window 201 some editions, for example, composing, layout, text input, etc.

DB function: To format, open and close optical disk 13, and to arrange all of the documents recorded on optical disk 13 under predetermined conditions, and to save the arranged document data into the file or to delete the document meeting predetermined conditions.

The scanner, printer, display and file have their own respective properties concerning the document transfers. Property sheets for changing or checking the properties of these devices can be displayed by display 9. FIGS. 4 to 7 show displays with these properties. These properties can be displayed by operating the function keys corresponding to function select keys on keyboard 20. The properties can also be displayed by using mouse 19. In this case, a mouse cursor is moved to a desired icon, and the right button of mouse 19 is pushed and released from its pushed state (clicked). To erase the property sheet, key F9 or F10 is pushed on the keyboard. When using mouse 19 for property sheet erasure, the mouse cursor is set to the icon of F9 (confirmation) or F10 (erasure), and the left button of the mouse is clicked.

The property sheet of the scanner is used for setting properties such as the size of an input document, document density, read-out resolution, and feed mode (book or ADF (automatic document feed) mode), also called batch mode. The book mode enters the image data of one sheet of document. The ADF mode successively enters the image data of the documents contained in the ADF holder.

The property sheet of the printer is used for setting the property of the number of printings, for example. The display property sheet is used for setting a display time of document in document window 201. The display time is useful when scanner 1 is operating in the ADF mode. For example, when document data are successively transferred from scanner 1, the display of one sheet of document continues for this display time. When the display time terminates, a sequence of entering the next document starts.

In the property sheet of the file, display 9 displays the information indicating what number of documents are now stored in the file, and which document is now read out or written into. When the document is read out from the optical disk, the continuous mode or batch mode is selected. This is similar to the ADF mode in the scanner property sheet.

Ten types of document data transfers as mentioned above will be described.

Mode 1

In the initial state, display 9 displays the image as shown in FIGS. 2 and 3. FIG. 8 shows the operations and the transient phases of changing states of the function area when the document data transfer mode of scanner (F1)/display (F3) is performed. In the figure, mark Fx (where x=1 to 10) indicates the operation to push a keyboard function key or the operation to click the left button by setting the mouse cursor to the icon corresponding to the function key within the function area.

In operation, icon F1, for example, is designated by the mouse cursor and at this designated position, the button of mouse 19 is clicked. In response to the click action, a marking frame is displayed on icon F1 (step (b)). Then, the mouse cursor is moved to icon F3 and the mouse button is clicked, and the marking frame is displayed on F3 icon. Under this condition, viz., when icon F3 is being indicated, if the mouse button is clicked again, the document data transfer from scanner 1 to display 9 starts. That is, when CPU 14 detects that the icon (i.e., F3) corresponding to the device finally designated has been designated two times, it outputs a signal (command) representing an execution of processing.

At this time, icons F1 and F3 are shaded, in step (d). Then, the document data is entered from scanner 1, and the document image is displayed on the document window 201 shown in FIG. 2. At the same time, the "next document" is displayed on icon F7 in the function area 202, in step (e). Under this condition, when icon F7 is designated by mouse 19 or keyboard 20, the document data is transferred from scanner 1 to display 9. When F10 icon (cancel) is designated, the document filing apparatus can be returned to the initial state, in step (f).

Icon F10 can be designated at any time. At the time points of steps (b) and (c), the designation of icon F1 or icons F1 and F3 is cancelled. At the time point of step (e), the document transfer from scanner 1 to display 9 is ended.

Generally, the document transfer is directed in the following way. In the order of the devices to which the document data are transferred, the icons corresponding to those devices are successively designated one time for each. Finally, the icon corresponding to the last device is designated again. In turn, the document data transfer starts, in an execution signal from CPU 14. The designations already made can be cancelled any time by designating the cancel icon F10, before the document transfer starts.

Modes M2 and M3

FIGS. 9 and 10 diagrammatically show the operation modes M2 and M3, respectively, of the scanner (F1)/printer (F2) and the scanner (F1)/file (F4). These operations are almost the same as the scanner (F1)/display (F3) operation. One difference is that the document data collected by scanner 1 is not displayed on display window 201, but is printed out (M2) or recorded (M3).

Modes M4 and M5

FIGS. 11 and 12 are diagramatical representations of the operation modes M4 and M5, respectively, of the file (F4)/display (F3) and the file (F4)/printer (F2). In the mode M4 of FIG. 11, the file-to-display document data transfer is executed when icon F4 is designated one time, and then icon F3 is designated two times. In the mode M5 of FIG. 12, the file-to-print document data transfer is executed when icon F4 is designated one time, and then icon F2 is designated two times.

In the operations of the above modes M4 and M5 shown in FIGS. 11 and 12, the steps (a) to (b) are the same as those of the previous modes. In step (3), one document is read out from optical disk 13. The read out document is displayed in document window 201 in the mode M4 of FIG. 11, and is printed out in the mode M5 of FIG. 12. Also in step (e), "Next page" and "Previous page" are displayed on icons F7 and F8. When the "Next page" appears, the counter, which indicates what document is read out when the file is read out, is counted up by one. When the "Previous page" appears, the counter is counted down by one. Then, the operation returns to step (d), and a similar document transfer is performed. When cancel icon F10 is designated, the document transfer is ended.

Modes 6 and 7

FIGS. 13 and 14 show the operation modes M6 and M7, respectively, of display (F3)/printer (F1) and display (F3)/file (F2). The operations of those modes are similar to the above ones. The operations of modes 1 to 7 are for document transfer between two devices. The description to follow is the document transfer among three devices.

Mode 8

Figure 15:
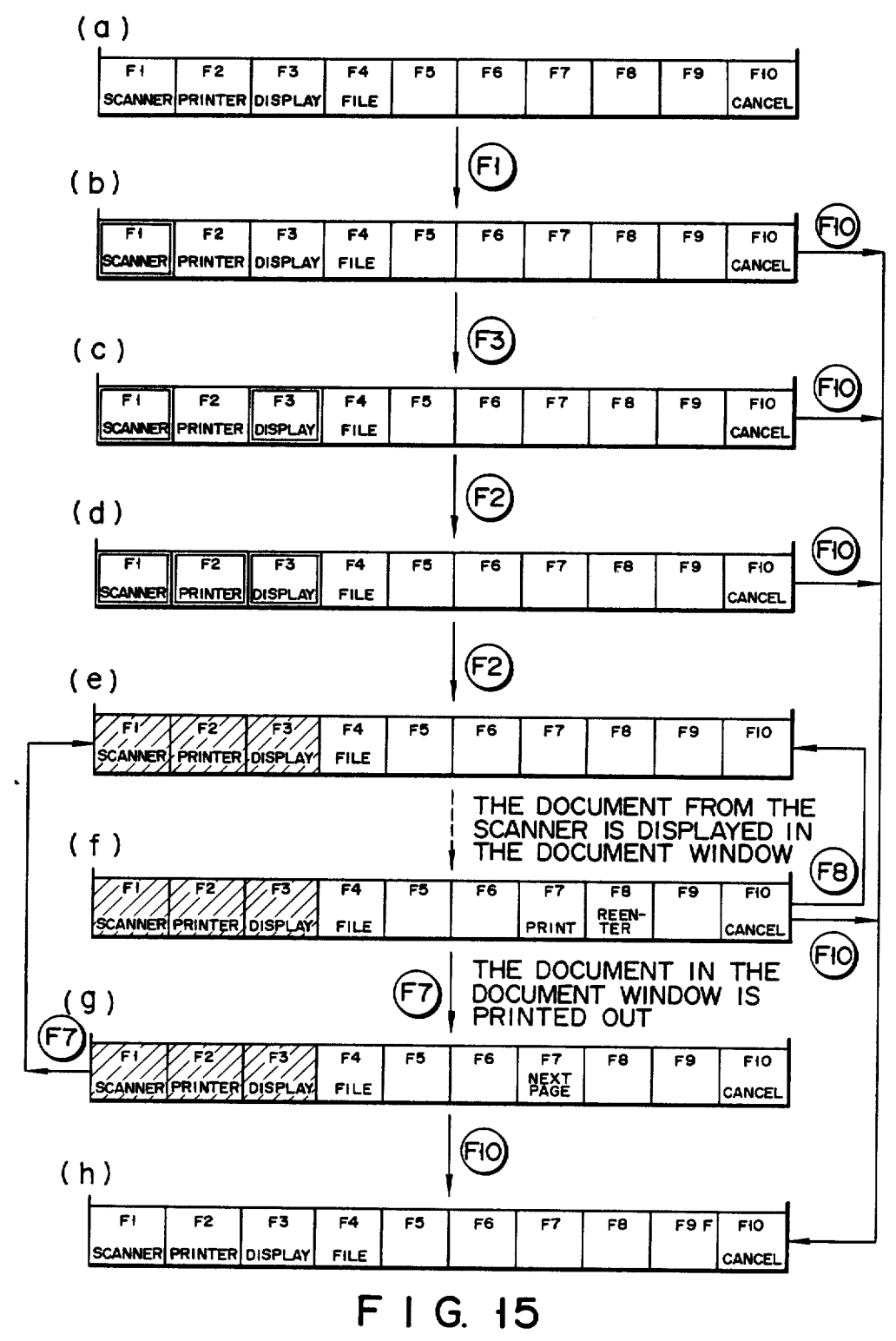

FIG. 15 shows a sequence of mode 8 operations of scanner (F1)/display (F3)/printer (F2). In this mode, icons F1 and F3 are designated one time for each in a successive manner. Finally, icon F2 is designated two times. When CPU 14 detects that icon F2 has been designated two times, the document data is transferred through the route of scanner-display-printer.

Steps (a) to (e) are for directing the document data transfer. In step (f), the document is scanned by scanner 1, and displayed on the window 201. At this point, the document data has been transferred between the scanner and the display. Also in step (f), "Print" and "Reenter" are displayed on the icons F7 and F8.

Under this condition, the operator checks the document in the window. After seeing the document, if deciding that the density of scanner 1 is improper, he selects the scan property sheet shown in FIG. 4 and sets its properties again, and designates "Reenter" icon F8. Upon this action by the operator, scanner 1 scans the document at the new property again, and document window 201 displays the document. If deciding that the document in the window is satisfactory, the print icon F7 is designated, so that the document data is transferred between the display and printer (step (g)). At this time, the icon F7 displays the "Next page"

When the icon F7 of "Next page" is designated, the operation returns to step (e) and the mode 8 for the scanner-display-printer is executed again from the first step. When icon F10 of "Cancel" is designated, the document transfer operation can be stopped at any time point. The operation to display the property sheets of the printer, display and file, and to check and change the properties, is possible also at any time point.

Modes 9 and 10

Figure 17:
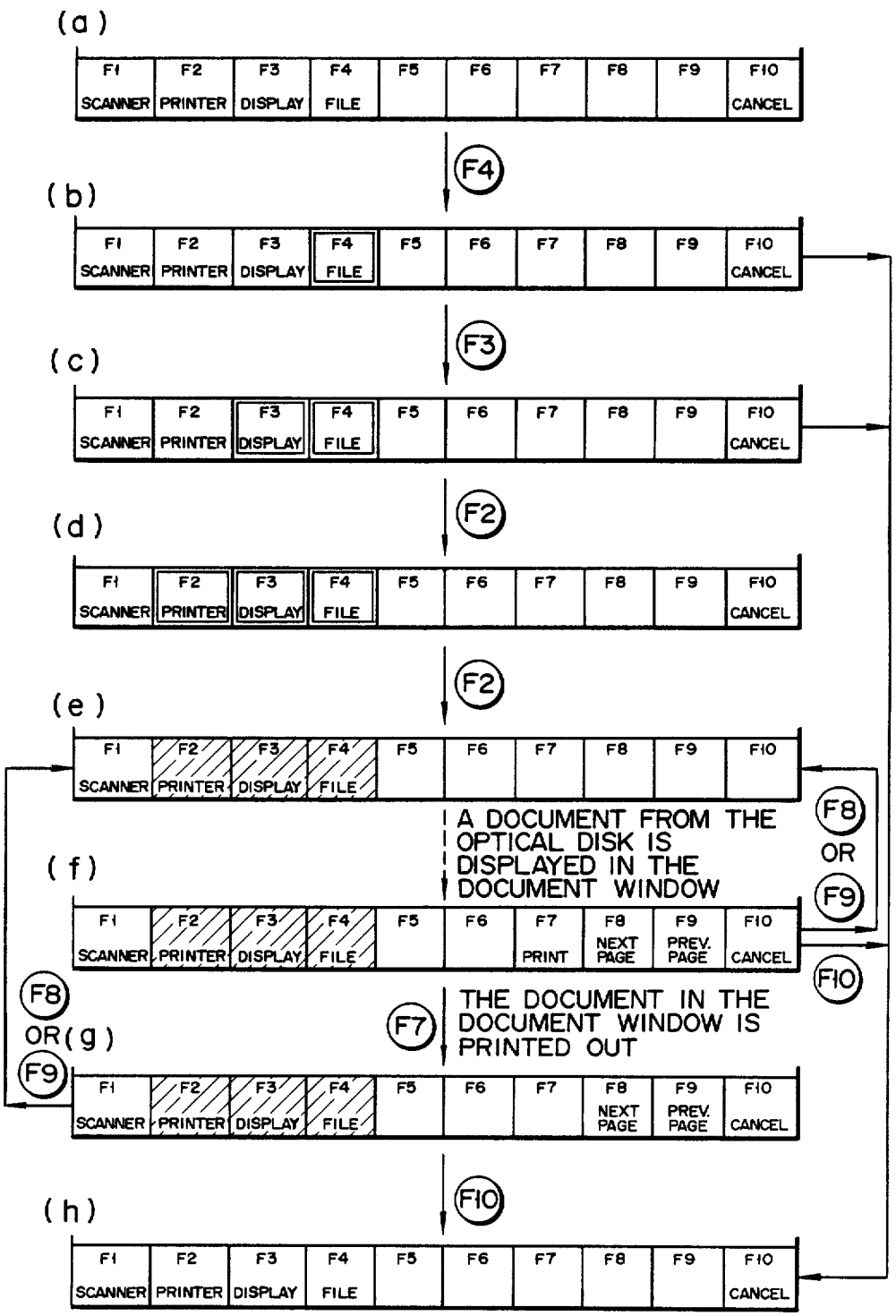

FIGS. 16 and 17, respectively, show a sequence of document data transfer operations of modes 9 and 10. Mode 9 transfers document data among scanner (F1), display (F3), and file (F4). Mode 10 transfers document data among file (F4), display (F3) and printer (F2).

In the operation modes as mentioned above, the properties of scanner 1 and file each indicates the book mode and the successive read-out mode. Every time one document is transferred, the step to check the displayed document is needed. This step corresponds to the steps (f) and (g) in FIG. 16.

Figure 18:
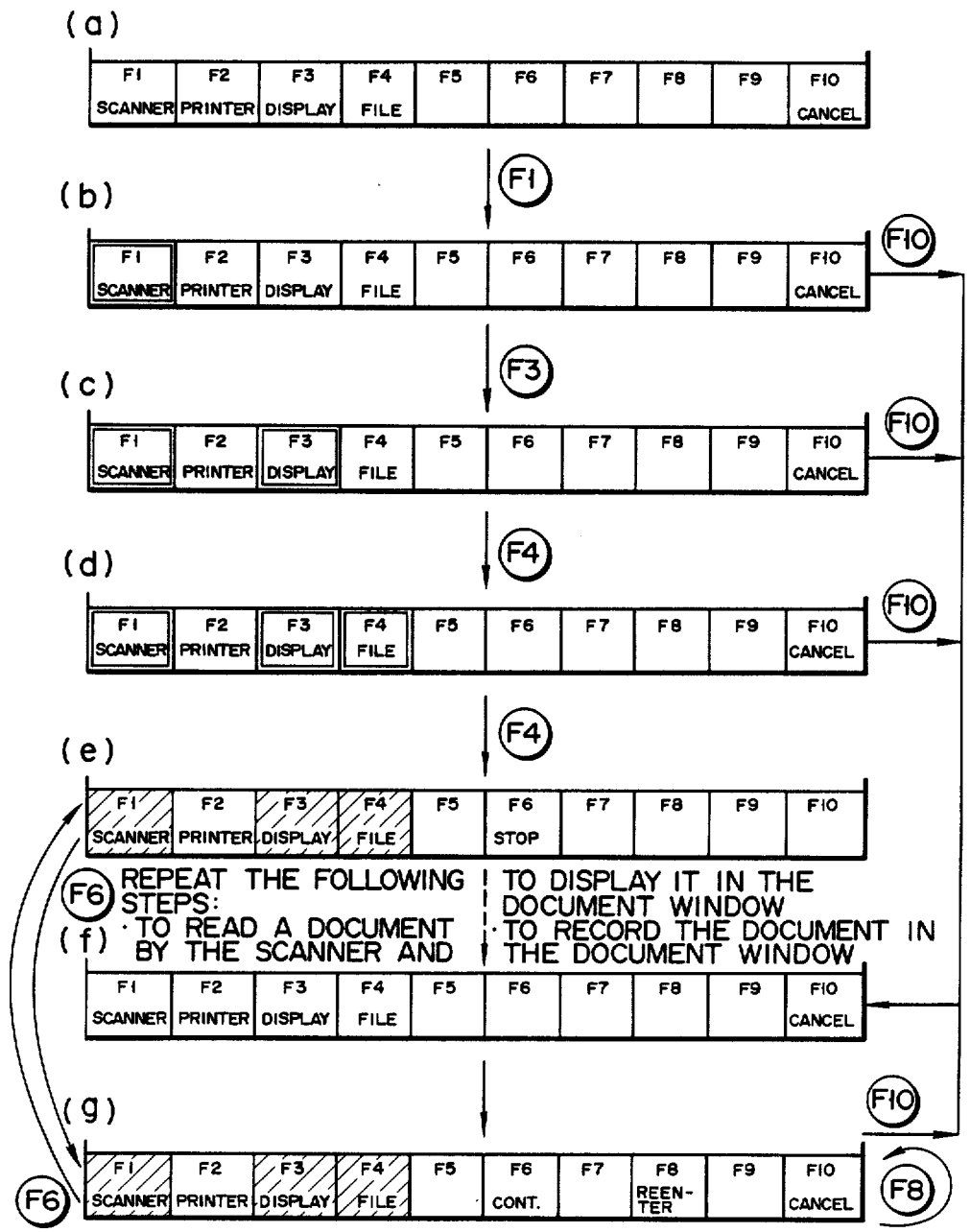

The operation of the document filing apparatus when the property of scanner 1 is the ADF mode, will be described. The same thing is true for the operation when the file is in the batch read-out mode. FIG. 18 diagrammatically shows a sequence of document data transfer among the scanner (F1), display (F3) and file (F4) when the scanner is in the ADF mode. In this operation sequence, the steps (a) to (e) are for directing the document transfer. This mode is different from the above-mentioned one in that, in step (e), "Stop" is displayed on icon F6. Unless the "Stop" icon is designated by the mouse cursor 19 in step (e), scanner 1 scans and reads out the document data of all of the documents contained in the ADF holder of the scanner. Each of these documents is displayed for a predetermined period of time on the document window, and then these document data are successively stored into optical disk 13.

The display time of document in the document window is set by the display property. When an operator designates the icon "Stop" in step (e), the document transfer is temporarily stopped, and function area 202 gives the display shown in step (g). Under this condition, if "Reenter" (F8) is designated, scanner reads out the document data.

When the stop of document transfer is removed, and the document transfer is started again, icon (F6) of "Continue" is designated, and the operation returns to step (e). When the data transfer of the holder contained documents is completed, or when icon "Cancel" (F10) is designated, the document transfer is completed, the operation goes to step (f).

As described above, when using the document filing system according to this invention, the directions for retrieval, record or registration, and the like can be executed by merely designating three to four icons representing devices.

If the display mode in menu bar area 203 shown in FIGS. 2 and 3 is designated, one and four document windows 201 can be alternately displayed. Four document image buffers corresponding to the four windows are provided in the device represented by "Display" (F3).

In the scanner-display document data transfer, i.e., in the mode M1, when one document window is used as shown in FIG. 2, the document is displayed on the document window 201. When four document windows 201 are used as shown in FIG. 3, the document is displayed on the document window 201 containing the "Final" icon located at the top in the menu bar area.

In the display-printer document transfer, i.e., the mode M6, the document displayed on the document window 201 with the "Final" icon, is printed out. Of those document windows, only one icon can have the "Final" icon. Every time the space key onto the keyboard is depressed, this icon is shifted from one window to another window. With depression of space key, the "Final" icon is cyclically shifted among those four document windows. This allows the operator to display a maximum of four documents in desired document windows 201, and further to print the document in a desired document window 201 or to record it into optical disk 13. The icon indicated by "Final" can be represented by a black mark, white mark, or stripe mark, etc.

In the display of FIG. 3(a), the document window 201 marked "1" in the upper left on the screen is the input/output document window. In the FIG. 3(b) display, the document window with "2" in the right upper is the input/output document window.

Figure 19:
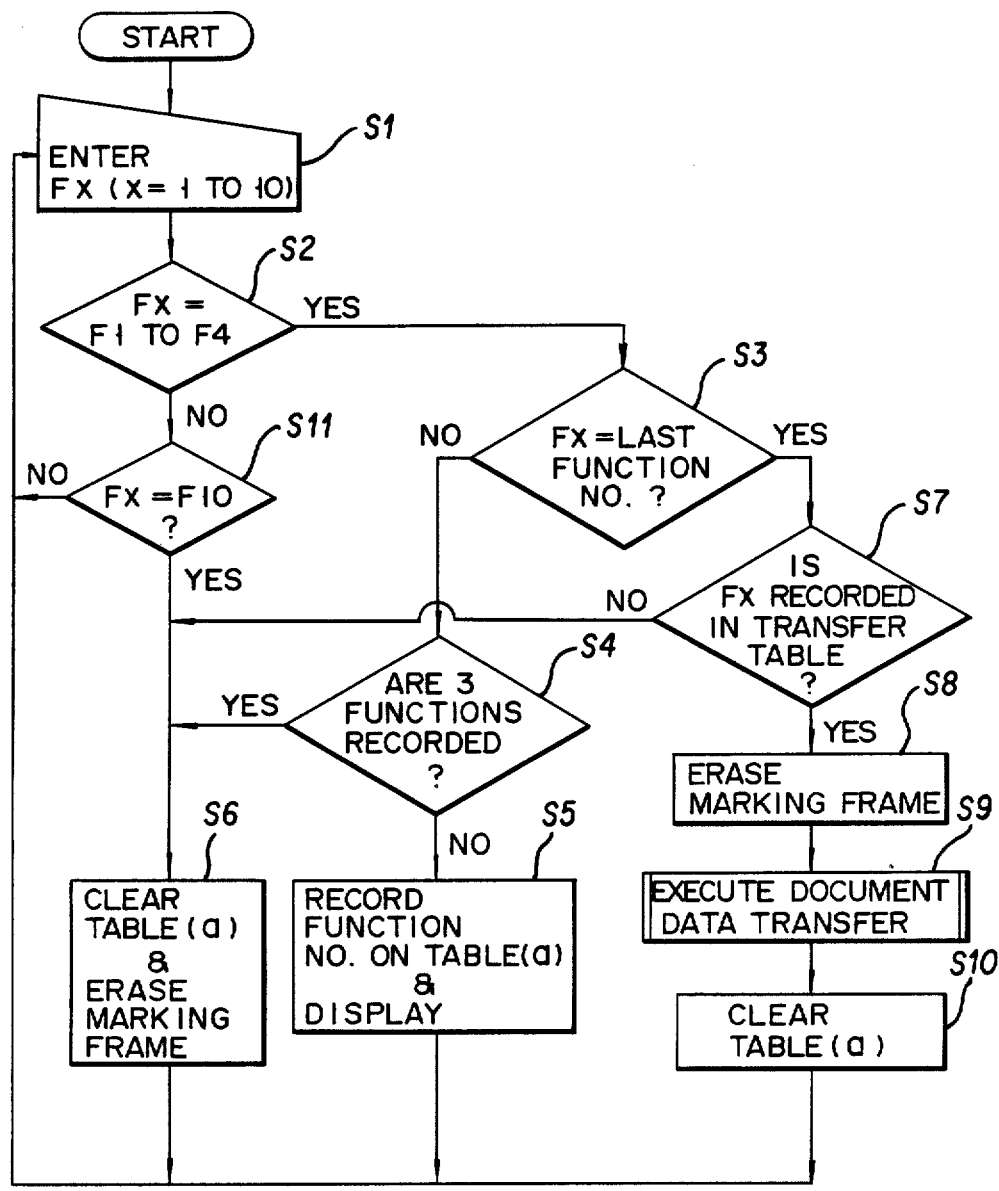
FIG. 19 shows a flowchart illustrating a flow of document data transfer operation.

The operations of the FIG. 1 circuit relating to the document data transfer operations as illustrated in FIGS. 8 to 18, will be described referring to a flow-chart of FIG. 19. Tables to be used in the description of the operations are illustrated in FIG. 20. A designation table (a) holds the number of icons as designated by the operator, and the order of function numbers corresponding to the icons. A transfer table (b) holds the number of icons for the document transfer processings which can be made by the document filing apparatus, and the order of function numbers. These tables are referred to during the document data transfer processings. These tables (a) and (b) are stored in CPU memory 17.

In operation, when the power supply is turned on, the initial states at the respective portions of the document filing apparatus are set up according to a program stored in CPU memory 17. At this time, display 9 displays document window 201, function area 202, and menu bar area 203, as shown in FIG. 2. This display pattern data is the data as transferred from the CPU memory or an external floppy disk to the display memory 7. Under this condition, the data corresponding to any of icons F1 to F10 is designated and entered by means of the keyboard or the mouse 19 (S1). The entered data is checked by CPU 14 to determine whether it coincides with one of icons F1 to F4 (S2). If the answer is YES, CPU 14 checks if the function number corresponding to the input or entered data coincides with the last function number in the designation table (a) of FIG. 20 (S3). If NO, CPU 14 checks if the function numbers of three or more have been recorded on the designation table (S4). If the answer is NO, the number of icons in the designation table is increased by one, and the function number as designated and entered is written into the designation table. The marking frame is displayed on the icon corresponding to the function number recorded anew (S5). After this, the operation returns to step S1.

If more than three function numbers are stored in the designation table, viz., the answer is YES, the designation table (a) is cleared, and the marking frame of icon is erased (S6). If the designated and entered function number coincides with the last function number in the designation table, the order (e.g., F1-F3) of the function numbers in the designation table (a) is compared with each of the orders (F1-F3, F1-F2, F1-F4, ...) of function numbers in the transfer table (b) (S7). If the same order is found, the marking frame in the icon is erased (S8) and the document transfer processing is started in the order shown in the designation table (a) (S9). For example, when the function numbers are stored in the designation table in the order of F1–F3, the document is read out by scanner 1, and the document data is transferred to the image data bus, through scanner printer interface 2. The document data in display memory 7 is read out by display controller 8, and input to display 9, and displayed as a document image. Thus, the document data transfer from scanner 1 to display 9 is automatically performed.

Upon completion of the document data transfer, the designation table (a) is cleared (S10), and the operation returns to step S1. If the order in the designation table (a) is not registered in the transfer table (b) (57), the designation table (a) is cleared and the marking frame of the icon is erased (S6), and the operation returns to step S1. If the designated and entered data is F10 (S11), the designation table (a) is cleared, and the marking frame of the icon is erased (S6), and the operation returns to step S1.

If the designation table (a) stores the function numbers in the order of F1–F3–F4 corresponding to the document data transfer operation of FIG. 16, the document is read out by scanner 1, and the document data is transferred to the image data bus via scanner printer interface 2. The document data on the Image data bus is transferred through image bus select controller 3 to image buffer memory 4 and display memory 7. The document data in display memory 7 is read out by display controller 8, and input display 9, and displayed in the form of a document image. The document data in image buffer memory 4 is read out, and input to compander 12 via image bus select controller 3 and the image data bus. The document data is subjected to the companding processing in compander 12, and is input to and stored in optical disk 13 as the file. In this way, the document data 1 is transferred to display 9 and optical disk 13, from scanner 1.

Figure 21:
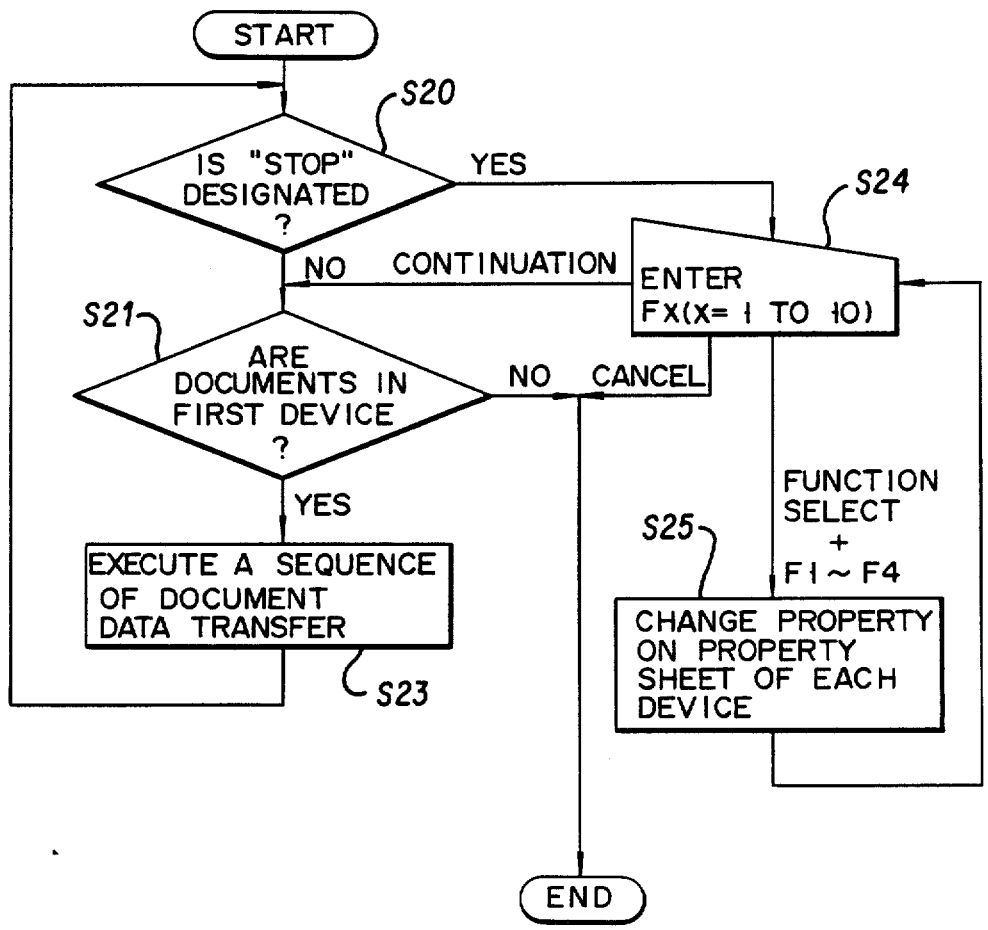
FIG. 21 shows a flowchart illustrating a flow of document data transfer when a continuous document readout mode is used.

The operation of the document filing apparatus to be described referring to FIG. 21 is the operation of FIG. 18 in which the mode of the first device in the document data transfer contains the ADF mode automatically feeding documents.

When the document data transfer processing starts, the CPU checks the readout mode of the first device (the first device in the designation table (a)), for example, scanner 1, in the document data transfer. When this mode is the batch read-out mode such as the ADF mode, the following operation procedure will be performed. The CPU checks if the "Stop" icon is designated (S20). If the answer is NO, the CPU checks whether the document to be transferred to scanner 1 is present or not (S21). If YES, a sequence of document data transfer processings are executed uninterruptedly (S23). For example, when the designation for the scanner, display and printer is made, the document data enter, the document display, and the document print are successively executed in connection with the first sequence of document data transfer processings.

After completion of the first sequence of the document data transfer processings, the CPU returns to the control flow to check the designation and entering of the "Stop" icon (S20). The second and subsequent sequences of document data transfer processings will be continued uninterruptedly until the "Stop" icon is designated or the transferred documents in the first device run out. As the documents in the first device run out, the document data transfer processing ends.

When the "Stop" icon is designated (S20), the document data transfer operation icon is stopped till the next designation and entering of data. When the "Continue" is designated (S24), the CPU returns to the control flow to check whether or not the document to be transferred is contained in the first device, and enters the control loop for the sequence of document data transfer processings.

In step S24 for designation and entering of data, the function select and F1 to F4 are designated and entered, the property sheets of the devices corresponding to F1 to F4 are displayed and the properties of these devices are checked and, if necessary, changed (S25). The control returns to step S24.

In the above-mentioned embodiment, at the start of document data transfer, the icon corresponding to the finally designated device is designated two times. An alternative measure to start the document data transfer is illustrated in FIG. 22. In the measure, the icon F9 in function area 202 displays "Execution" for executing the data transfer. This icon F9 is designated by a mark cursor or related corresponding function keys on the keyboard. More specifically, in FIG. 22, to start the execution of the mode M3 of the scanner-file document transfer, the icons are designated in the order of F1 (scanner), F4 (file) and F9 (execution). After the start of data transfer processing, the "Execution" disappears in icon F9.

As described above, the document data transfer processing can be repeatedly executed uninterruptedly by setting the first device in the continuous read-out mode.

It is evident that this invention is applicable to other data processors such as CD-ROMs, word processors, and personal computers, in addition to the document filing apparatus. When it is applied to CD-ROMs, scanner 1 for document data entering is not required.

As described above, the number of steps for many operations, for example, document data retrieval, is reduced, and the operation shifts can be made smoothly.

What is claimed is:

1. A data processing apparatus comprising:
   filing means for filing data;
   display means for displaying the data filed in said filing means and a plurality of commands including at least a display command for displaying the data from said filing means, and a file command for filing the data displayed on said displaying means;
   means for sequentially, manually designating the commands displayed on said display means;
   first detection means, for detecting the commands in the order in which the commands have been designated by said designating means;
   second detection means, for detecting the completion of the designation of the commands, and outputting a signal representing the completion of the designation; and
   means for driving at least one of said filing means and said display means, in the order in which the commands have been designated by said designating means, in response to the signal output from said second detection means.

2. The data processing apparatus according to claim 1, wherein said display means has means for superimposing a marking frame on each of the commands designated by said designating means.

3. The data processing apparatus according to claim 1, wherein said second detection means includes means for detecting that said designating means has designated one of said commands at least two times, and for transferring to said driving means a command initiating execution of processing.

4. The data processing apparatus according to claim 1, wherein said driving means includes means for driving, in the designated order, said filing means and said display means, in response to the signal from said second detection means.

5. The data processing apparatus according to claim 1, wherein said display means includes means for displaying an execution command representing execution of processing, and wherein said second detection means includes means for detecting that the execution comand has been designated by said designating means, and for transferring to said driving means a signal initiating execution of processing.

6. The data processing apparatus according to claim 5, wherein said display means includes means for erasing the execution command, in response to the receipt of the signal from said second detection means.

7. The data processing apparatus according to claim 1, wherein said data processing apparatus further comprises scanning means including a scanner for scanning a document to produce image data of the document.

8. The data processing apparatus according to claim 1, wherein said filing means includes an optical disk device for recording the data.

9. The data processing apparatus according to claim 1, wherein said designating means includes a mouse for controlling a cursor displayed on the display means for selectively designating the commands displayed on said display means.

10. A data processing apparatus comprising:
means for scanning a document to obtain picture information;
means for storing picture information;
means for displaying the picture information in said storing means, and for displaying a plurality of commands representing said storing means, said scanning means, and said display means;
means for sequentially, manually designating the command representing said display means and at least one of the commands representing said storing means and said scanning means;
first detection means, for detecting the commands in the order in which the commands have been designated by said designating means;
second detection means, for detecting the completion of the designation of the commands, and for outputting a signal representing the completion of the designation;
means for setting a batch mode for the command first designated by the designating means to continuously process data; and
means for continuously driving said display means and at least one of said storing means and said scanning means, in the order in which the commands have been designated by said designating means, in response to the signal output from said second detection means when said batch mode is set for said first designated command.

11. The data processing apparatus according to claim 10, wherein said display means displays a "stop" command for instructing the stopping of processing, and wherein said second detection means detects that the "stop" command is designated by said designating means, and outputs the signal indicating the end of processing, and wherein said setting means releases the batch mode in response to the stop signal.

12. The data processing apparatus according to claim 10, wherein said second detection means has means for detecting that said continuous processing has been completed, and said setting means releases the batch mode in response to the detection of completion of said continuous processing.

13. The data processing apparatus according to claim 10, wherein said display means includes means for superimposing a marking frame on the commands designated by said designating means.

14. The data processing apparatus according to claim 10, wherein said second detection means includes means for detecting that said designating means has designated one of the commands at least two times, and for transferring to said drive means, the signal representing the completion of the designation.

15. The data processing apparatus according to claim 10, wherein said display means displays an "execution" command representing execution of processing, and wherein said second detection means detects that the "execution" command has been designated by said designating means, and for transferring to said drive means the signal representing completion of the designation.

16. The data processing apparatus according to claim 10, wherein said designating means designates, in a selective sequence, said scanning means, said storing means, and said display means.

17. The data processing apparatus according to claim 16, wherein said storing means is an optical disk device for recording the image data.

18. The data processing apparatus according to claim 10, further including means for printing the information, and wherein said designating means includes means for designating, in a selective sequence, said display means, said printing means and said storing means.

19. A data processing apparatus comprising:
display means for displaying image information to be processed, and a plurality of commands including a display command and a file command;
selecting means for sequentially, manually selecting two of the plurality of commands displayed on said display means; and
optical memory means for storing the image information displayed on the display means, in response to the display command and the file command sequentially selected by said selecting means.

20. A data processing apparatus comprising:
means for displaying data, and a plurality of commands including an input command, a file command, and a display command;
means for sequentially, manually selecting at least two of the plurality of commands displayed on said display means;
means for inputting data in response to only the input command and at least one of the display command and the file command, which commands are sequentially selected by said selection means; and
means for storing the data input by said inputting means, in response to only the input command followed by at least one of the file command and a command group sequentially including the display command and the file command; and
wherein said display means displays the data from one of said inputting means and said storing means, in response to one of the input commands, the file command, and the display command, which commands are sequentially selected by said selecting means.

21. In a data processing apparatus including a scanner for scanning data, a file device for filing the data, a display for displaying the data, and a printer for printing the data, a method for processing the data comprising the steps of:

displaying, on the display, at least two of a scanner command for instructing the inputting of data from the scanner, a file command for instructing the filing of the data either for input or output, a display command for instructing the displaying of data either for input or output, and a printing command for instructing the printing of data for output;

selecting, in a desired order, the commands displayed on said display; and executing the selected commands, in the order in which the commands have been selected, wherein the data input according to a first command is output by subsequent commands.

22. The method according to claim 21, wherein said selecting step comprises a step of selecting the scanner command first, the display command second, and the printing command third.

23. The method according to claim 21, wherein said selecting step comprises a step for selecting the scanner command first, the display command second, and the file command third.

24. The method according to claim 2, wherein said selecting step comprises a step for selecting the file command first, the display command second, and the printing command third.

* * * * *